US005683660A

United States Patent [19]
Wirth et al.

[11] Patent Number: 5,683,660
[45] Date of Patent: Nov. 4, 1997

[54] METHOD FOR UNITING AN EXHAUST TREATMENT BODY WITH ITS HOUSING AND AN EXHAUST TREATMENT APPARATUS

[75] Inventors: Georg Wirth, Kirchheim; Siegfried Wörner, Esslingen; Peter Zacke, Albershausen, all of Germany

[73] Assignee: J. Eberspächer GmbH & Co., Esslingen, Germany

[21] Appl. No.: 368,148

[22] Filed: Dec. 29, 1994

[30] Foreign Application Priority Data

Dec. 31, 1993 [DE] Germany ............... 43 45 055.5

[51] Int. Cl.⁶ ..................................................... B01D 53/56
[52] U.S. Cl. ........................... 422/171; 422/177; 422/179
[58] Field of Search ............................ 422/171, 177, 422/179

[56] References Cited

U.S. PATENT DOCUMENTS

| | | |
|---|---|---|
| 4,322,388 | 3/1982 | Hardin et al. . |
| 4,400,860 | 8/1983 | Nonnenmann et al. . |
| 5,250,269 | 10/1993 | Langer . |

FOREIGN PATENT DOCUMENTS

| | | |
|---|---|---|
| 0 471 175 A1 | 6/1991 | European Pat. Off. . |
| 0 494 049 A1 | 12/1991 | European Pat. Off. . |
| 2224639 | 10/1974 | France . |
| 38 34 779 A1 | 4/1990 | Germany . |
| 42 44 315 A1 | 3/1994 | Germany . |
| 58-32917 | 2/1983 | Japan . |
| 1455855 | 11/1976 | United Kingdom . |

*Primary Examiner*—Timothy McMahon
*Attorney, Agent, or Firm*—McGlew and Tuttle

[57] ABSTRACT

A method for uniting an exhaust treatment body (2) surrounded by a bedding mat (6) with a metal case (8) forming a housing for the exhaust treatment body, characterized in that one or two preformed metal blanks are pressed by means of a form tool (10) against the exhaust treatment body (2) surrounded by the bedding mat (6) and thereby brought into the final case form; and the thus formed metal blank or blanks are welded to the case (8) along one or two longitudinal seams (28). An afflux funnel (44) and a discharge funnel are preferably welded on by means of a special triple seam (56).

8 Claims, 6 Drawing Sheets

METHOD FOR UNITING AN EXHAUST TREATMENT BODY WITH ITS HOUSING AND AN EXHAUST TREATMENT APPARATUS

FIELD OF THE INVENTION

The present invention relates to a method for uniting an exhaust treatment body surrounded by a bedding mat with a metal case forming a housing for the exhaust treatment body.

BACKGROUND OF THE INVENTION

A widespread technique for uniting an exhaust treatment body with its housing is to construct the housing from two shell-like housing halves previously pressed into the necessary shape, insert the exhaust treatment body surrounded by the bedding mat in one of the housing halves, place on the second housing half and finally weld the two housing halves together along longitudinally extending welding rims. For this technique rather narrow tolerances must be maintained.

A further, well-known technique is to place a metal blank with its first longitudinal edge against the exhaust treatment body and hold it there, and apply tensile force to the other longitudinal edge of the metal blank in a direction such that the metal blank wraps itself around the exhaust treatment body. One then welds the two longitudinal edges of the metal blank together. This technique can only be used in practice with exhaust treatment bodies having a circular cross section.

SUMMARY AND OBJECTS OF THE INVENTION

The invention is based on the problem of providing a method of the abovementioned type which is also practicable with exhaust treatment bodies having a non-circular cross section.

To solve this problem the method is characterized in that one (or two) preformed metal blanks are pressed by means of a form tool against the exhaust treatment body surrounded by the bedding mat and thereby brought into the final case form; and the thus formed metal blank (or blanks) are welded to the case along one (or two) longitudinal seams.

In the inventive method the metal blank or blanks conform perfectly with the periphery of the exhaust treatment body, automatically compensating tolerances both in size and in shape (deviation from the nominal geometry). Regardless of where the dimensions of the exhaust treatment body just "packed" in the case lie within the tolerance zone, the union of the exhaust treatment body and the case is always achieved with substantially the nominal press-in force of the bedding mat. In other words, it is no longer the bedding mat that must ensure the tolerance compensation between the exhaust treatment body and the housing; the housing adapts to the exhaust treatment body in its tolerances. It is of particularly great importance that the inventive method readily permits not only exhaust treatment bodies having a circular cross section to be "packed", but exhaust treatment bodies having all common cross-sectional geometries, e.g. oval, rounded triangle, etc.

The exhaust treatment bodies provided in the invention are preferably treatment bodies for catalytic elimination of undesirable exhaust components or particle filters. The former treatment bodies are generally made of ceramics or metal with a multiplicity of longitudinal channels and a catalyst-containing coating applied to the channel walls. Carbon black filters exist particularly in the form of ceramic bodies with longitudinal channels alternatingly closed at the end, in the form of filter pads constructed from fibers, and the like. As a bedding mat one can provide any bedding element customary for holding an exhaust treatment body in the associated housing, in particular a bedding mat made of temperature-resistant fibers, a so-called swelling mat that increases in volume when temperature increases due to an addition to a basic fibrous material, or a knitted metal layer. The bedding mat is generally placed or wound around the periphery of the exhaust treatment body once or, in some cases, several times.

It is pointed out that a plurality of exhaust treatment bodies can also be provided in tandem in the longitudinal direction according to the invention. In this case the plurality of exhaust treatment bodies are "packed" with a common case by the inventive method.

One preferably uses for the inventive method a form tool having a plurality of individual form tool parts, each for a partial area of the case periphery. It is particularly preferred for at least some of the form tool parts to be pivoted on their own carriers. In this way one can cause the metal blank to be pressed against the exhaust treatment body or bedding mat with substantially the same pressure everywhere along the periphery of the exhaust treatment body. Using simple means one can thus have the case lie against the bedding mat uniformly all around with a definite pressure, even when the exhaust treatment body has a non-circular cross-sectional geometry.

Alternatively one can preferably use a form tool having one or more fluid chambers for hydrostatically applying deformation force to the metal blank or blanks via a flexible fluid chamber wall. This results in a perfectly uniform pressure of the case against the bedding mat and indirectly the exhaust treatment body contained therein.

A preferred development of the invention is that a preferably double-walled afflux funnel and a preferably double-walled discharge funnel are welded along a peripheral seam to the axial ends of the case. "Afflux funnel" and "discharge funnel" are common terms in the field of exhaust treatment apparatus and designate the transition pieces passing from an exhaust pipe to the greater cross section of the exhaust treatment body housing. These transition pieces are usually not conic; they are only supposed to create a transition to the greater housing cross section which is favorable to flow.

The afflux funnel and discharge funnel preferably each have at the end on the exhaust treatment body side a radially outwardly extending end area of the inner funnel wall, and the peripheral seam welds are directed toward the edge of the end area of the inner funnel wall in such a way that the weld seam interconnects the axial end of the case, the end the inner funnel wall there and the end of the outer funnel wall there. There is thus a triple seam with which the double-walled afflux or discharge funnel can be welded particularly efficiently to the case. This manner of welding also involves the very substantial advantage that tolerances in the relation between the cross-sectional size of the case and the cross-sectional size of the funnel in question are virtually absorbed in the weld seam. This will become clearer below in the description of embodiment examples.

It is stressed that this special manner of welding the funnel to the case has independent inventive importance, i.e. can be used not only in connection with the above-described "packing" of the exhaust treatment body in the case.

A further subject of the invention is an exhaust treatment apparatus having an exhaust treatment body surrounded by a bedding mat and held in a metal case as a housing, characterized in that the case is formed from one (or two) preformed metal blanks that have been pressed by means of a form tool against the exhaust treatment body surrounded by the bedding mat and thereby brought into the final case form; and the metal blank (or blanks) are welded to the case along one (or two) longitudinal seams.

Finally, a subject of the invention is an exhaust treatment apparatus having an exhaust treatment body surrounded by a bedding mat and held in a metal case as a housing, and a double-walled afflux funnel and a double-walled discharge funnel which are welded along a peripheral seam to the axial ends of the case, characterized in that the afflux funnel and discharge funnel have at the end on the exhaust treatment body side a radially outwardly extending end area of the inner wall; and the peripheral seam welds are directed toward the edge of the end area of the inner funnel wall in such a way that the weld seam interconnects the axial end of the case, the end of the inner funnel wall there and the end of the outer funnel wall there.

Both inventive exhaust treatment apparatus described involve advantages in terms of production technology as were dealt with above in connection with the inventive method. One can also build exhaust treatment apparatus according to the invention which have the features contained in the two preceding paragraphs in combination.

The longitudinal seam of the case preferably has a metal overlap thereon which bears the welding. Working with a metal overlap has the advantage that a peripheral length compensation can take place there depending on how much peripheral length of the metal has been "used up" for encasing the exhaust treatment body with bedding mat.

BRIEF DESCRIPTION OF THE DRAWING

The invention and embodiments of the invention will be explained more closely in the following with reference to embodiment examples shown in the drawing, in which.

DESCRIPTION OF THE PREFERRED EMBODIMENT

Figure 1:
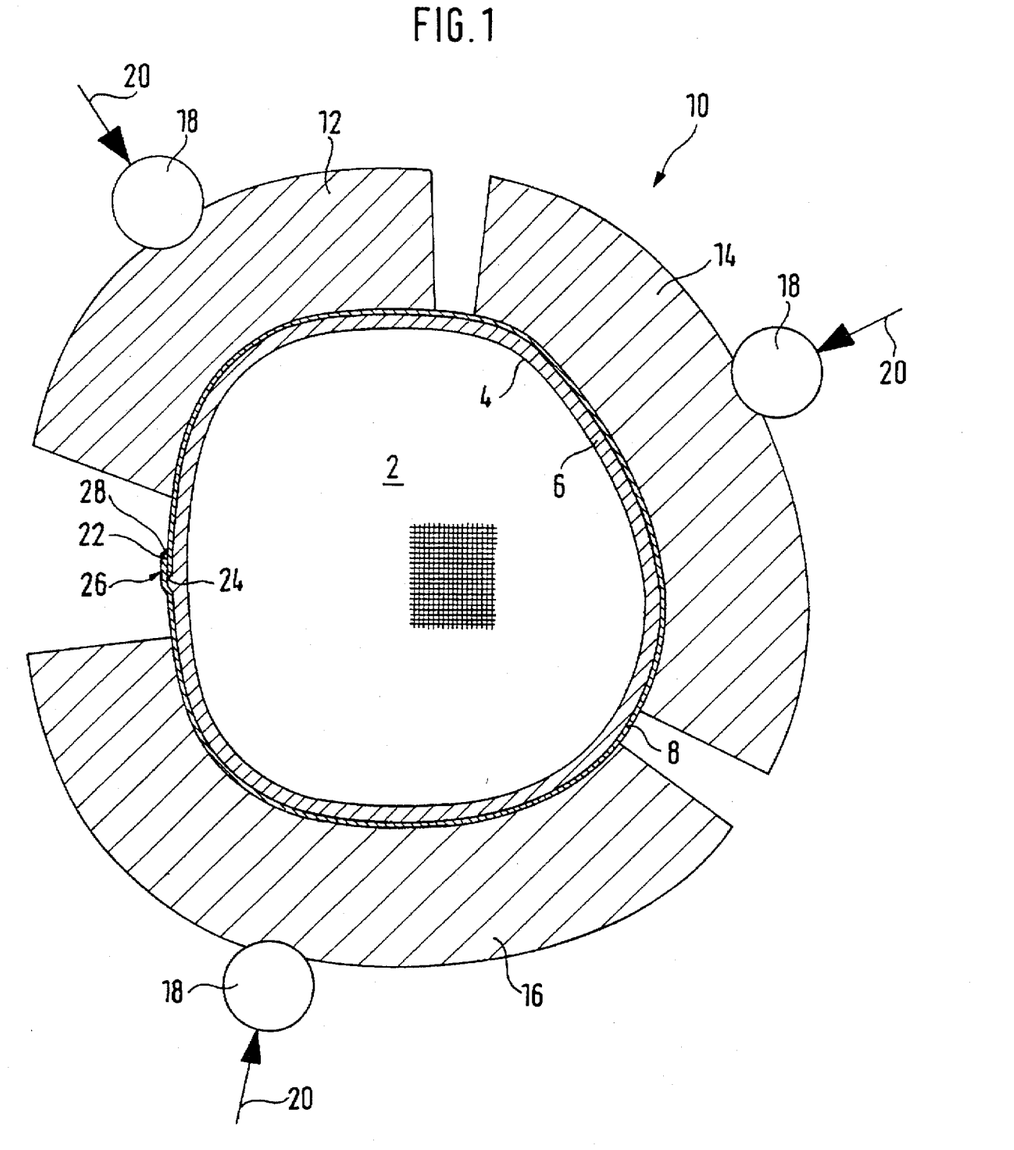
FIG. 1 shows a strongly schematized cross section of a form tool and the deformation produced therewith into a case for an exhaust treatment body.

In FIG. 1 one first sees exhaust treatment body 2 in the form of a ceramic monolith with a multiplicity of longitudinal channels and a non-circular cross section. Exhaust treatment body 2 is surrounded on periphery 4 by wrapped-around bedding mat 6, e.g. a basically known swelling mat. Exhaust treatment body 2 and bedding mat 6 are "packed" by case 8 provided around the outside.

Form tool 10 is shown in strongly schematized form. It comprises three form tool parts 12, 14, 16 each provided for deforming a partial area of the periphery of case 8 and spaced apart from one another progressing in the peripheral direction. In the axial direction (i.e. the direction extending perpendicular to the plane of projection) form tool parts 12, 14, 16 are substantially as long as exhaust treatment body 2 and case 8. Form tool parts 12, 14, 16 are contoured on the inside in accordance with the nominal peripheral course of exhaust treatment body 2.

Axially extending swiveling axis 18 for each form tool part 12, 14, 16 indicates that each form tool part can perform swivel movements about this axis. The carrying element for each form tool part is not drawn in, the described possibility of swivel movement existing relative to the carrying element in question.

To close form tool 10 the three carrying elements and thus three form tool parts 12, 14, 16 are moved in the direction of drawn-in part 20 toward exhaust treatment body 2. This presses case 8 against bedding mat 6 and thus indirectly against exhaust treatment body 2, whereby the motion of the carrying elements and form tool parts causing the pressure of case 8 takes place with a force such that substantially equal force per unit of area is exerted on case 8 on the inner side of each form tool part. The relatively short case portions between the individual form tool parts in the peripheral direction are virtually deformed from the left and right at the same time.

The initial state of the case is a substantially rectangular metal blank that is inserted, prebent, into open form tool 10. Exhaust treatment body 2 is inserted into the preformed metal blank in the axial direction. When the form tool parts are moved together the metal blank wraps itself around bedding mat 6 with a definite surface pressure; metal overlap 26 forms in the area of longitudinal edges 22, 24 of the metal blank. Finally longitudinal seam 28 is welded on metal overlap 26 before "packed" exhaust treatment body 2 is removed. After the form tool parts have been moved apart, exhaust treatment body 2 "packed" with case 8 can be removed.

The deformation by means of form tool parts 12, 14, 16 is generally only an elastic deformation so that case 8 adapts perfectly and closely to exhaust treatment body 2 with bedding mat 6.

Figure 2:
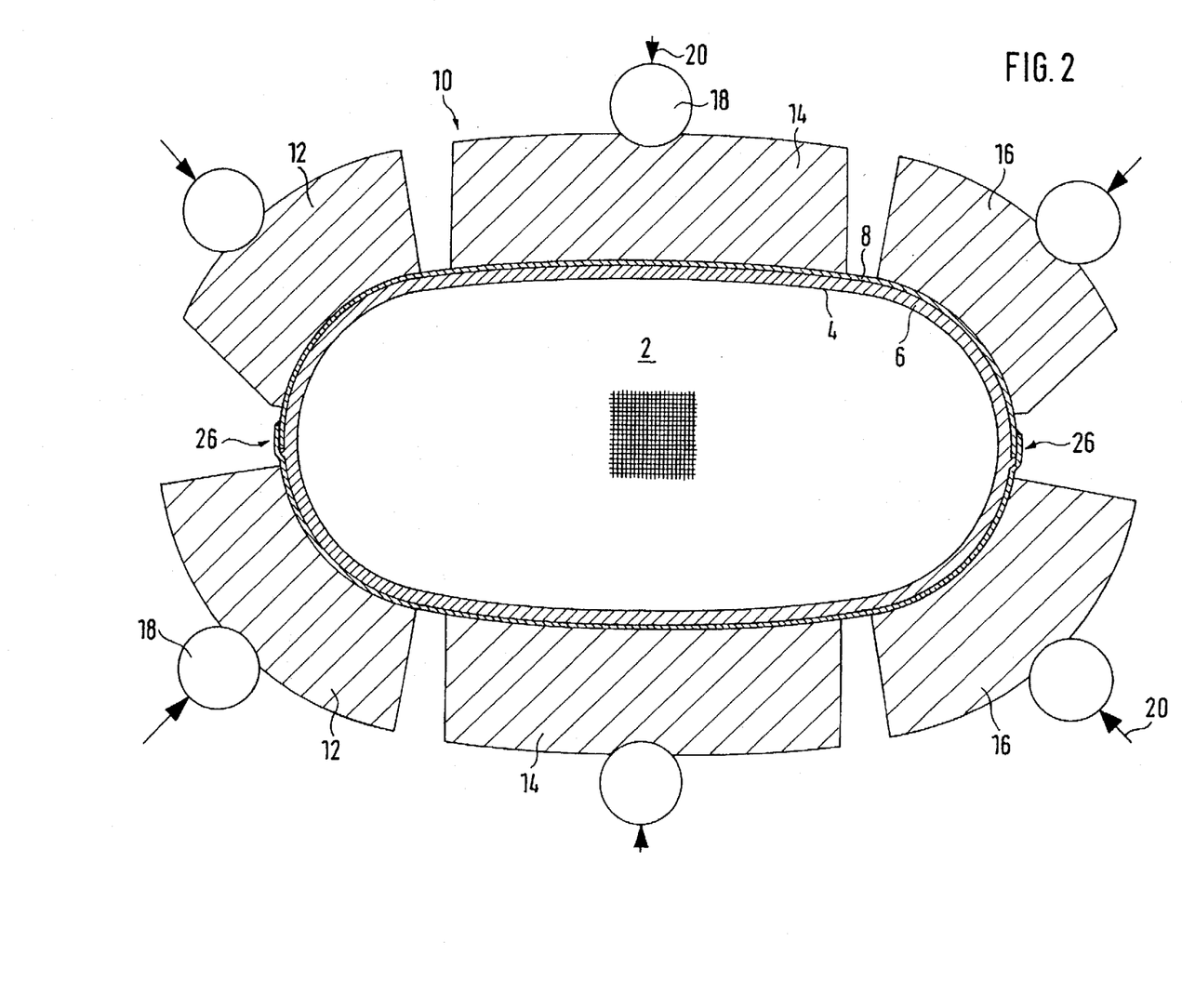
FIG. 2 shows a strongly schematized cross section of a form tool in another embodiment.

The variant shown in FIG. 2 serves mainly to illustrate the possibility of producing case 8 from two metal blanks. The exhaust treatment body shown has an oval configuration and three form tool parts 12, 14, 16 per case half. Instead of one longitudinal weld seam 28 there are now two longitudinal weld seams 28, each on metal overlap 26.

In particular with certain cross sections geometrically "more difficult" for the final bending deformation of the metal blanks, it may be favorable if the form tool part or parts furthest away from weld seam 28 to be produced last is moved in the closing direction in advance; this is form tool part 14 in the embodiment example of FIG. 1. Thus, when the form tool is closed the metal blank is automatically pushed with its free longitudinal edges toward the area where weld seam 28 is to be provided subsequently.

Figure 3:
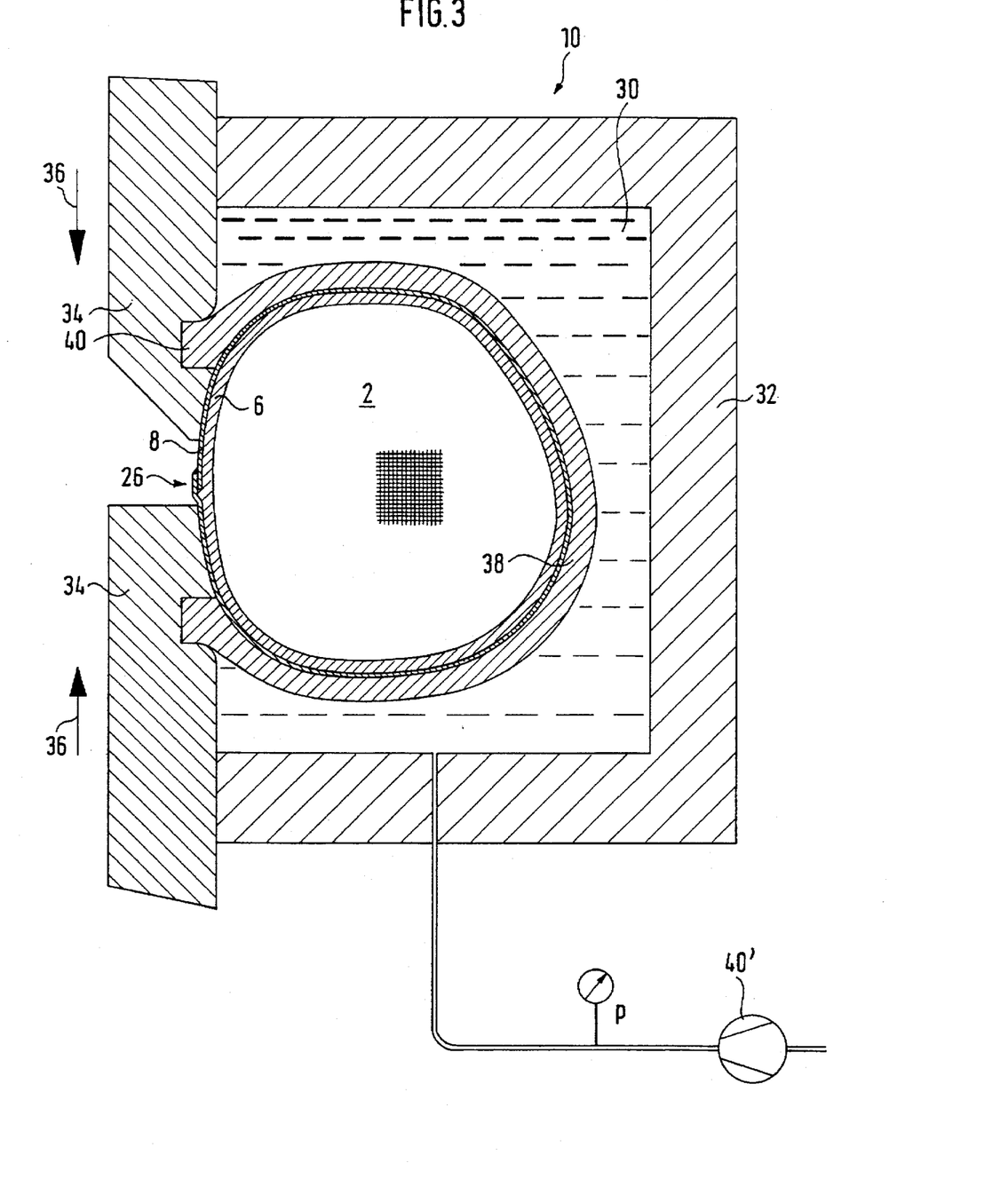
FIG. 3 shows a schematized cross section of a form tool working with fluid pressure.

FIG. 3 illustrates that one can use, instead of form tool parts 12, 14, 16 described, form tool 10 constructed and operating on the principle of the hydrostatic press. Fluid chamber 30 is limited by plane walls 32 on three sides of the cross section shown. On the fourth side two wall portions 34 are present that can be moved further toward or away from each other by motion along arrow 36 in their plane of extension. Flexible fluid chamber wall 38 whose cross section shown is roughly C-shaped, made e.g. of a rubbery material, is anchored with its free longitudinal end areas 40 in movable wall portions 34 and constitutes an inner limitation of fluid chamber 30.

When movable wall portions 34 are moved apart contrary to the direction of arrows 36 (not shown in the drawing) there is such a great free space that a prebent metal blank and exhaust treatment body 2 surrounded by bedding mat 6 can be introduced in the axial direction into the inner, "dry" side of flexible fluid chamber wall 38. Fluid chamber 30 filled with a liquid is then pressurized by means of pump 40. Also, movable wall portions 34 are moved toward each other. Wherever flexible fluid chamber wall 38 lies against case 8 the latter is pressed with perfectly uniform pressure against bedding mat 6 and thus indirectly exhaust treatment body 2. Obviously, fluid chamber 30 is likewise closed off in this phase at its axial ends, i.e. in front of and behind the plane of projection. Metal overlap 26 and longitudinal seam 28 to be produced are located in the free space between the two movable wall portions 34.

It is pointed out that uniform fluid chamber 30 shown in FIG. 3 can be replaced by a plurality of fluid chambers distributed over the periphery of the exhaust treatment body.

Figure 4:
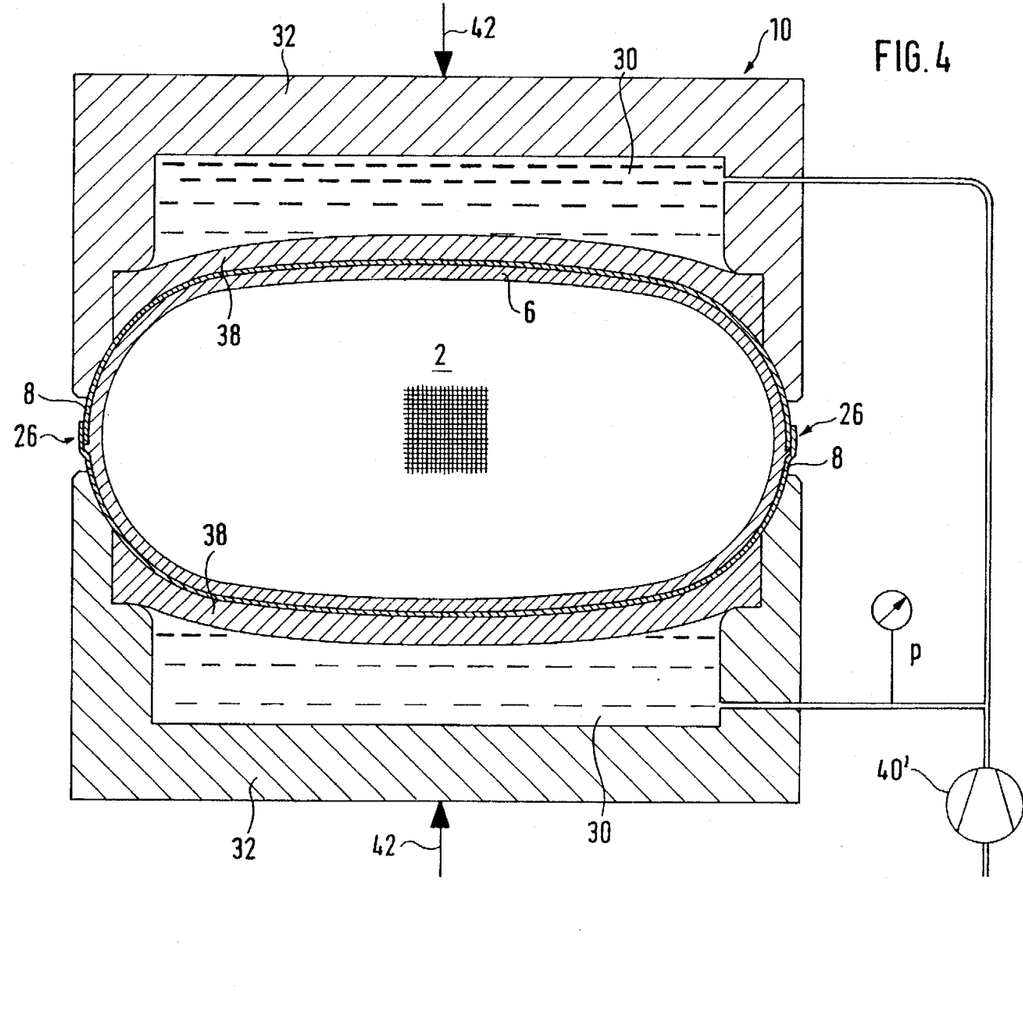
FIG. 4 shows a schematized cross section of a form tool working with fluid pressure in another embodiment.

FIG. 4 illustrates how form tool 10 constructed on the principle of the hydrostatic press can be designed if two metal blanks and two longitudinal weld seams are used, in analogy to the transition from FIG. 1 to FIG. 2. It is apparent that in this case each form tool half can be built more simply, i.e. without movable wall portions. For insertion and removal the two form tool halves can be moved toward and away from each other in accordance with arrows 42.

Figure 5:
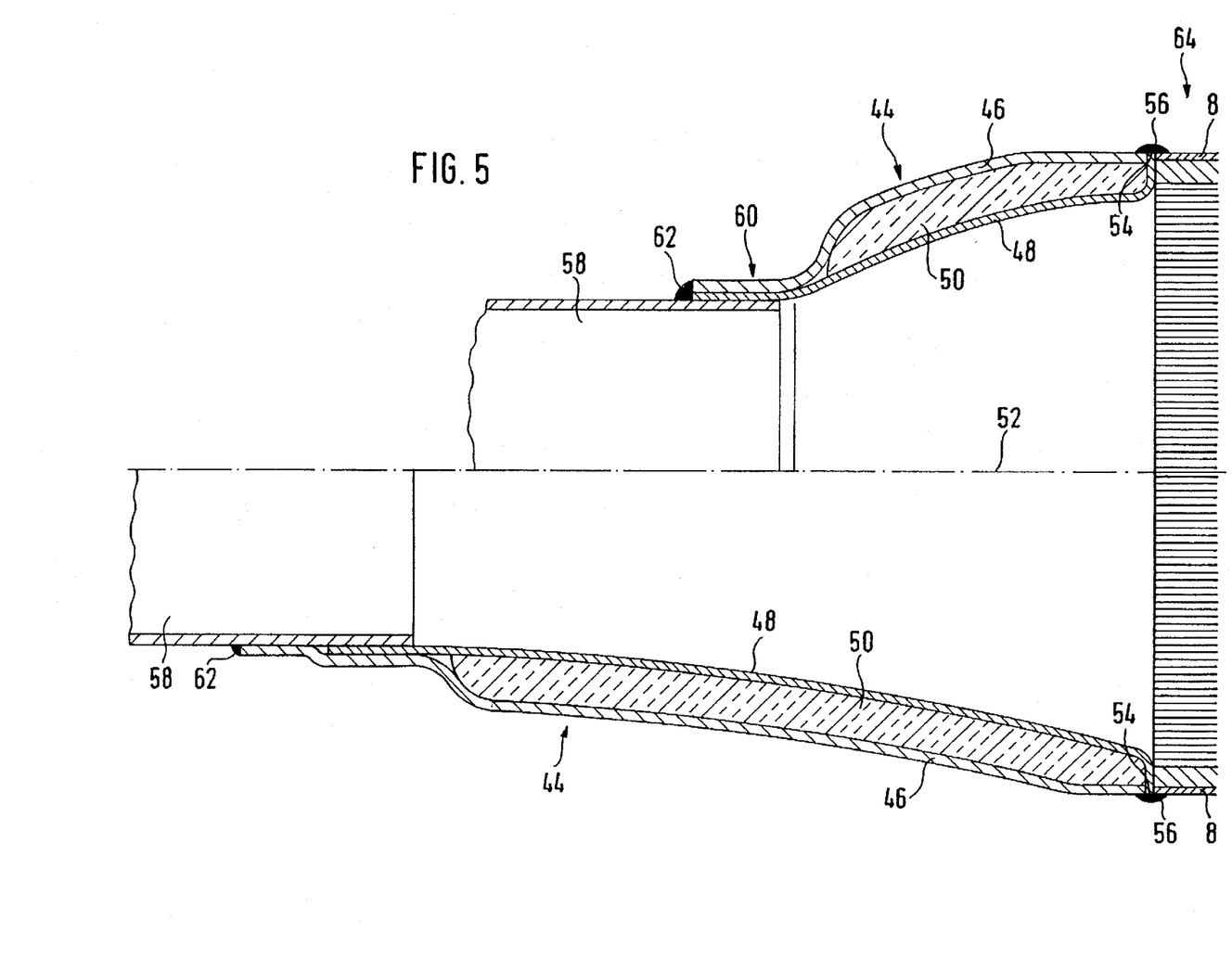
FIG. 5 shows a longitudinal section of part of an exhaust treatment apparatus, a first embodiment in the upper half and a second embodiment in the lower half.

FIG. 5 illustrates how afflux funnel 44 is welded with its right end to the left axial end of case 8 of exhaust treatment body 2. Funnel 44 is double-walled with outer wall 46 and inner wall 48. Between outer wall 46 and inner wall 48 there is basically known insulating mat 50. In its end area on the right in FIG. 5, inner wall 48 is bent so that it leads outside in a plane at right angles to longitudinal axis 52 of the exhaust treatment apparatus and covers the axially pointing end edge of outer wall 46 there. The radially outward pointing edge of inner wall 48 is designated 54.

The left axial end of case 8, the end of inner funnel wall 48 and the right axial end of outer funnel wall 46 are welded together with single peripheral weld seam 56. The weld is directed radially so that the described triple seam can be produced with a single weld.

The discharge funnel not shown is welded on the right axial end of case 8 analogously.

FIG. 5 also illustrates the design of the left end area of funnel 44 fastened to exhaust pipe 58, FIG. 5 top showing a first variant and FIG. 5 bottom a second variant. The upper variant is suitable particularly for funnels 44 which are relatively short in the axial direction, wherein the thermal expansion differences between outer wall 46 and inner wall 48 do not make up very considerable lengths. In left end area 60 of funnel 44, outer wall 46 and inner wall 48 lie against each other with no insulating mat therebetween and are connected at the end to the exhaust pipe with common fillet weld 62.

The variant in FIG. 5 bottom relates to funnels 44 which are longer in the axial direction. Here the left end area of inner wall 48 is received with a basically known close sliding fit between exhaust pipe 58 and outer wall 46. Outer wall 46 is welded to exhaust pipe 58 with fillet weld 62.

Figures 6, 7:
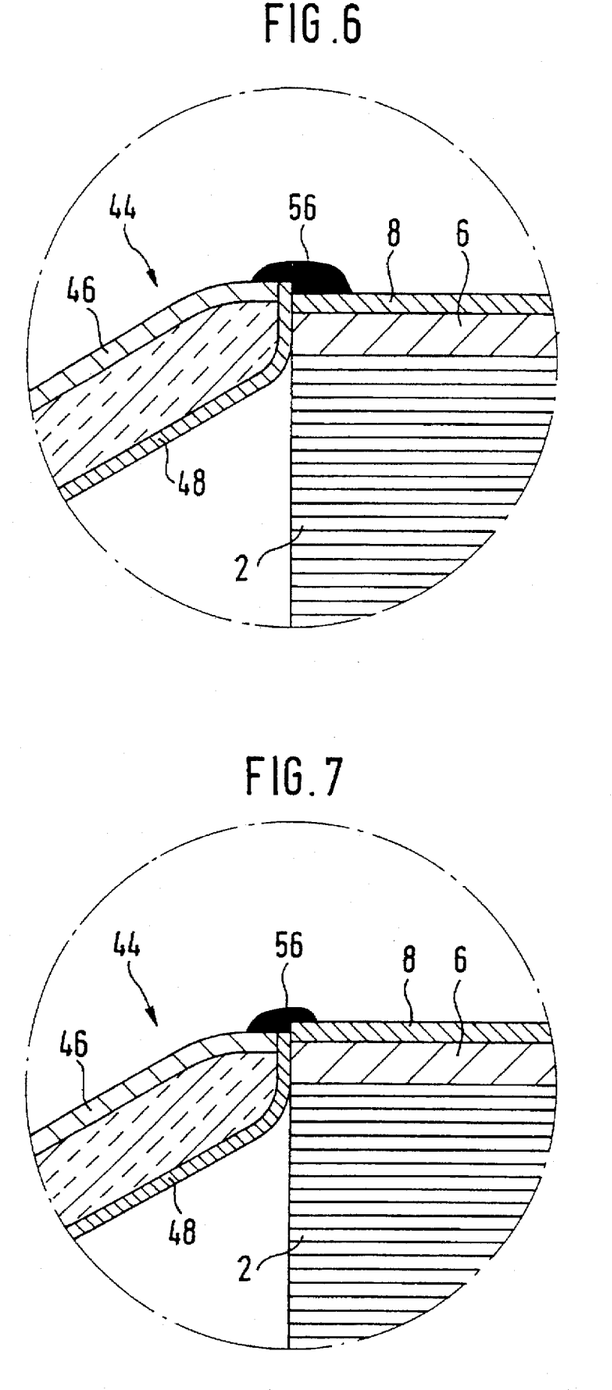
FIGS. 6 and 7 each show a detail on an enlarged scale from FIG. 5, namely two different weld seam configurations.

FIG. 6 illustrates what described triple seam 56 looks like when case 8 has at its left axial end a somewhat smaller outer periphery than funnel 44 at its right end. FIG. 7 shows the reverse case, namely a somewhat greater outer periphery of case 8 than funnel 44. FIGS. 6 and 7 are intended to illustrate that the described manner of peripheral welding, directed to the edge of the end area of inner wall 48, can absorb in a technically elegant way the peripheral differences that result due to dimensioning tolerances in particular of exhaust treatment body 2.

If one has exhaust treatment apparatus 64 with two exhaust treatment bodies 2 spaced apart in tandem in the axial direction, one preferably uses one form tool per exhaust treatment body 2 simultaneously or successively.

The invention is particularly well suited for producing exhaust treatment apparatus 64 by the modular concept. One can provide a type series of "middle parts", i.e. one or more exhaust treatment bodies 2 packed in case 8, with different axial lengths and optionally also with different cross-sectional dimensions. One welds on funnels 44 from a standardized number, whereby funnels 44 can differ in axial length, cross-sectional form at the end on the exhaust treatment body side, diameter at the other end, curvature or bend, and the like. In this way one needs less constructional and manufacturing effort to cope with a multiplicity of automobile models with different courses of the exhaust train and different engine outputs.

The inventive exhaust treatment apparatus are preferably provided for the exhaust train of internal combustion engines.

Finally it is stressed that case 8 can alternatively be made from double metal sheet whose two layers are glued together. The design of case 8 with double metal sheet leads to a reduction of sound emission from the exhaust treatment apparatus. Since case 8 is heated during operation of exhaust treatment apparatus 64 to a much lesser extent than e.g. inner wall 48 of funnel 44, adhesives are available today that ensure sufficiently temperature-resistant gluing between the two layers of the double metal sheet.

While specific embodiments of the invention have been shown and described in detail to illustrate the application of the principles of the invention, it will be understood that the invention may be embodied otherwise without departing from such principles.

We claim:

1. An exhaust treatment apparatus, comprising:

an exhaust treatment body;

a bedding mat surrounding said exhaust treatment body;

a metal case forming a housing holding said bedding mat surrounding said exhaust treatment body, said housing with said metal case and said bedding mat surrounding said exhaust treatment body having a flangeless first axial end and a flangeless second axial end;

a double-walled afflux funnel including an outer wall and an inner wall, said inner wall terminating in a radially outwardly extending flange with a flange side surface abutting said first axial end;

a double-walled discharge funnel including an outer wall and an inner wall, said inner wall terminating in a radially outwardly extending flange with a flange side surface abutting said second axial end;

a first peripheral weld seam, in contact with said double-walled afflux funnel radially outwardly extending flange, in contact with said double-walled afflux funnel outer wall and in contact with said metal case, said first peripheral weld seam connecting said double-walled afflux funnel to said metal case;

a second peripheral weld seam in contact with said double-walled discharge funnel radially outwardly extending flange, in contact with said double-walled discharge funnel outer wall and in contact with said metal case, said second peripheral weld seam connecting said double-walled discharge funnel to said metal case.

2. The exhaust treatment apparatus of claim 1, wherein a metal overlap is present on a longitudinal seam of said metal case.

3. The exhaust treatment apparatus of claim 2, wherein said metal case is formed from a preformed metal blank, said preformed metal blank being pressed against said exhaust gas treatment body surrounded by said bedding mat with a form tool and being welded along said longitudinal seam to provide a final metal case form.

4. The exhaust treatment apparatus of claim 2, wherein said metal case is formed from a plurality of preformed metal blanks, said preformed metal blanks being pressed against said exhaust gas treatment body surrounded by said bedding mat with a form tool and being welded along said longitudinal seam and along at least one additional longitudinal seam to provide a final metal case form.

5. An exhaust treatment apparatus, comprising:

an exhaust treatment body having a first axial end and a second axial end;

a bedding mat surrounding said exhaust treatment body, said bedding mat having a first axial end and a second axial end;

a metal case forming a housing holding said bedding mat surrounding said exhaust treatment body, a flangeless first axial end of said metal case, said first axial end of said bedding mat and said first axial end of said exhaust treatment body terminating substantially in a plane forming a housing first axial end face, a flangeless second axial end of said metal case, said second axial end of said bedding mat and said second axial end of said exhaust treatment body terminating substantially in a plane forming a housing second axial end face, a double-walled afflux funnel including an outer wall and an inner wall, said inner wall terminating in a radially outwardly extending flange with a flange side surface abutting said first axial end face and extending in contact with said axial end face from said bedding mat to said metal case;

a double-walled discharge funnel including an outer wall and an inner wall, said inner wall terminating in a radially outwardly extending flange with a flange side surface abutting said second axial end face and extending in contact with said axial end face from said bedding mat to said metal case;

a first peripheral weld seam, in contact with a radially outward tip of said double-walled afflux funnel radially outwardly extending flange, in contact with said double-walled afflux funnel outer wall and in contact with said metal case, said first peripheral weld seam connecting said double-walled afflux funnel to said metal case;

a second peripheral weld seam in contact with a radially outward tip of said double-walled discharge funnel radially outwardly extending flange, in contact with said double-walled discharge funnel outer wall and in contact with said metal case, said second peripheral weld seam connecting said said double-walled discharge funnel to said metal case.

6. The exhaust treatment apparatus of claim 5, wherein a metal overlap is present on a longitudinal seam of said metal case.

7. The exhaust treatment apparatus of claim 6, wherein said metal case is formed from a preformed metal blank, said preformed metal blank being pressed against said exhaust gas treatment body surrounded by said bedding mat with a form tool and being welded along said longitudinal seam to provide a final metal case form.

8. The exhaust treatment apparatus of claim 6, wherein said metal case is formed from a plurality of preformed metal blanks, said preformed metal blanks being pressed against said exhaust gas treatment body surrounded by said bedding mat with a form tool and being welded along said longitudinal seam and along at least one additional longitudinal seam to provide a final metal case form.

* * * * *